Dec. 25, 1934.   H. S. JANDUS   1,985,413
TIRE COVER
Filed Dec. 1, 1930   2 Sheets-Sheet 1
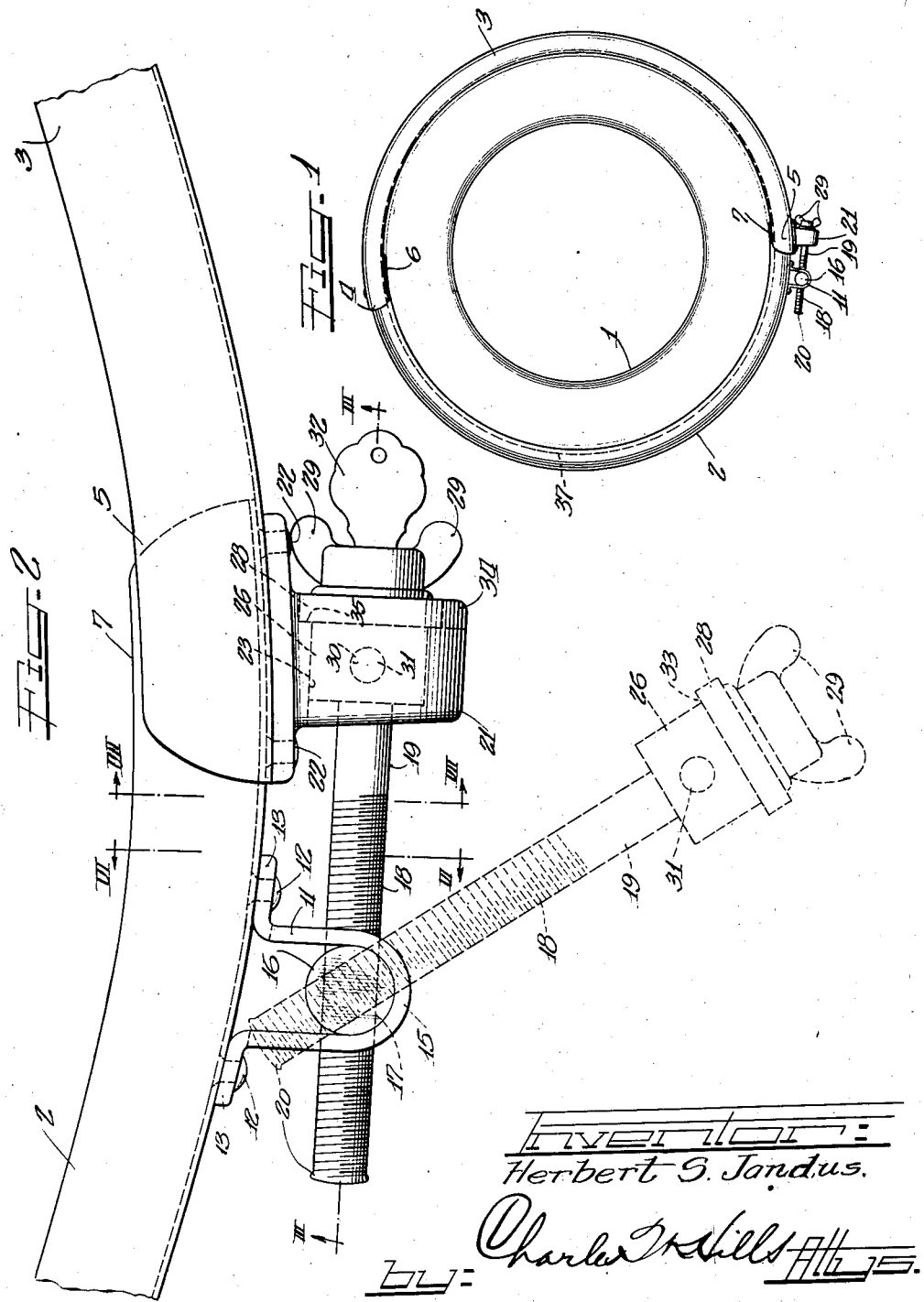
Inventor:
Herbert S. Jandus.
by Charles T. Hills Atty.

Dec. 25, 1934.  H. S. JANDUS  1,985,413
TIRE COVER
Filed Dec. 1, 1930  2 Sheets-Sheet 2
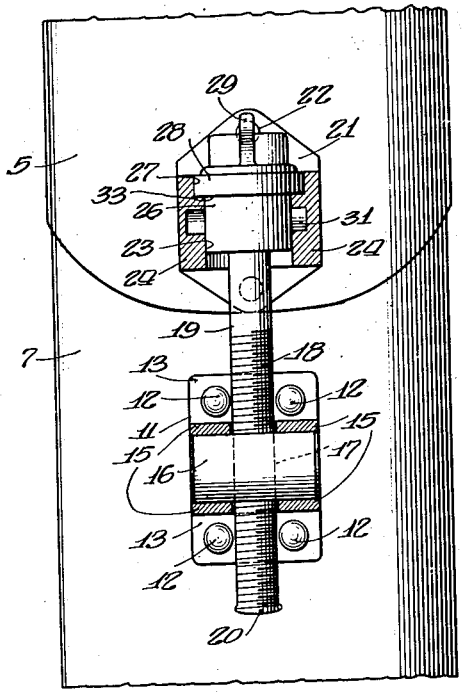
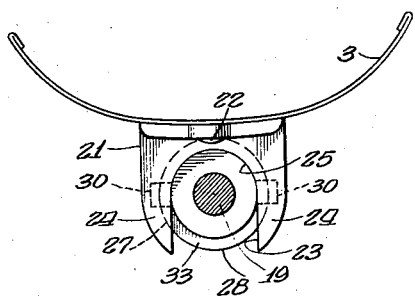
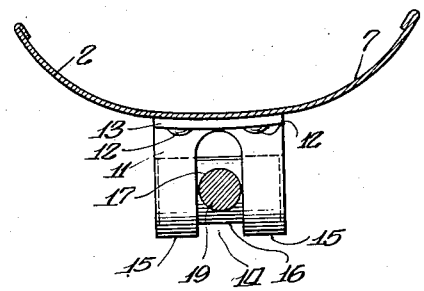
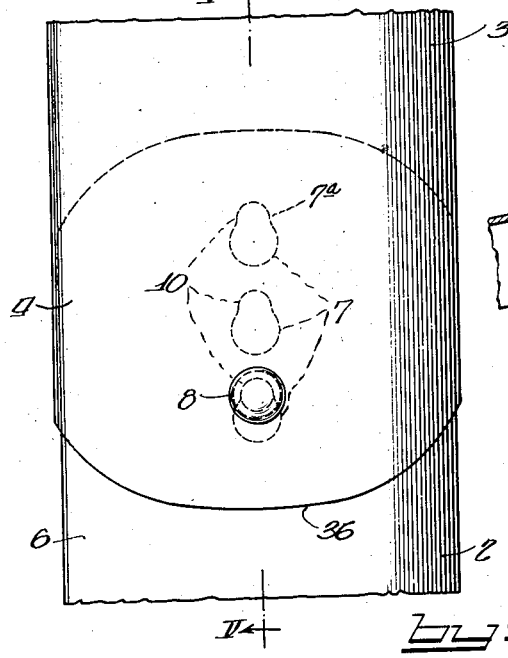
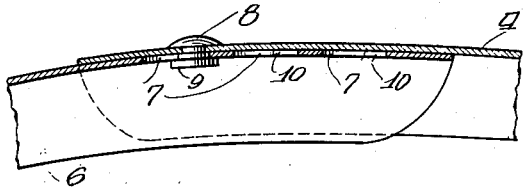
Inventor:
Herbert S. Jandus.

Patented Dec. 25, 1934

1,985,413

UNITED STATES PATENT OFFICE 1,985,413

TIRE COVER

Herbert S. Jandus, Detroit, Mich., assignor to Lyon Cover Company, Detroit, Mich., a corporation of Michigan Application December 1, 1930, Serial No. 499,266

6 Claims. (Cl. 150—54)

This invention pertains to tire covers, more particularly of the character made of metal and adapted for disposition about a spare tire of an automobile or the like.

Previous attempts at arriving at a metallic tire cover have been generally more or less unsuccessful because of inability to provide a cover of this type which is of simple construction, embodying few parts, enjoying an extremely low cost of manufacture, capable of ease of assembly and disassembly, and presenting a neat appearance, and at the same time providing adequate protection to the tire not only against the elements, but also against bruises. Moreover, such constructions have further lacked a suitable anti-theft device.

It is accordingly one of the principal objects of the present invention to provide a metallic tire cover which suitably protects the tire from injury not only from the elements but from bruises.

A further object of the invention resides in the provision of a tire cover applicable to tires of various sizes.

Another object is attained by the provision of a simple locking means incorporated with a tire cover adapted to be used in connection with various sizes of tires.

It is a further object of the invention to provide a multi-part tire cover, a portion of which serves to hold itself and the remainder of the cover in place on a tire.

A still further object of the invention resides in the provision of a metallic tire cover having the desirable characteristics set forth above, certain parts being resilient to accommodate various sizes of tires.

A further object of the invention is to provide a tire cover which may be fixed upon a spare tire against unauthorized removal, regardless whether the tire be mounted upon a wire, wooden or disc wheel, and also regardless whether the tire be carried at the rear or in a fender well of an automobile.

In carrying out the invention, I provide a substantially two-part annular member preferably arcuate in transverse section to accommodate the transverse curvature of the tire. The parts are preferably of substantially equal length, and the ends of one of said parts preferably overlap the ends of the other. At one juncture, the corresponding ends of the cover parts are provided with detachable and adjustable interlocking instrumentalities which may be in the form of a plurality of alined keyhole slots in one end and a corresponding headed pin secured to the cooperating ends of the other part and engageable selectively in any one of said keyholes. The opposite juncture of the cover parts includes suitable bracket members on the adjacent ends connected by a threaded element which serves to tighten up the cover about the tire, the parts being so arranged that the threaded element may be separated to enable removal of the headed pin from its corresponding keyhole slot. Novel locking means is preferably incorporated with the threaded member and associated instrumentalities for anti-theft purposes.

The foregoing annular member may be resilient and may be used as a tire cover. However, it may be desirable to employ in connection therewith an annular member engageable with that side wall of the tire which faces away from the vehicle upon which it is carried. The side plate is preferably of a diameter such that its outer periphery is overlapped by both members of the first mentioned annular cover, so that once the latter is locked on the tire, the side plate is automatically also locked in place and cannot be removed.

Other and further important objects and advantages of this invention will be apparent from the disclosure in the specification and the accompanying drawings.

This invention (in a preferred form) is illustrated in the drawings and hereinafter more fully described.

On the drawings:

Figure 1 is an elevation of a tire cover made in accordance with the present invention.

Figure 2 is an enlarged fragmentary view of the locking and adjusting instrumentalities employed in connection wtih the tire cover, showing also a key inserted in operative position.

Figure 3 is a fragmentary sectional view taken approximately in the plane indicated by the line III—III in Figure 2, certain parts being shown in elevation and the key being omitted.

Figure 4 is an enlarged fragmentary top plan view of Figure 1 showing certain detachable, adjusting and interlocking means.

Figure 5 is a fragmentary sectional view taken approximately in the plane indicated by the line V—V of Figure 4.

Figure 6 is a transverse sectional view taken approximately in the plane indicated by the line VI—VI in Figure 2.

Figure 7 is a sectional view taken approximately in the plane indicated by the line VII—VII in Figure 2, one of the cover parts being omitted.

As shown on the drawings:

Referring now more particularly to the drawings, wherein the same parts are indicated in each case by the same reference characters, I indicate at 1 an annular member of a width substantially commensurate with the width of a side wall of a tire, and having an arcuate cross-section corresponding somewhat to the curvature of the side wall of a tire. The complemental part of the tire cover comprises a pair of cooperating substantially semi-annular outer ring segments 2 and 3, the ends 4 and 5 of the segment 3 being adapted to overlie or overlap the corresponding ends 6 and 7 of the segment 2. Each of the segments 2 and 3 is arcuate in cross-section to correspond generally with the transverse curvature of the outer peripheries of tires, and the parts are so dimensioned diametrically, that the side plate 1 will be overlapped by the segments 2 and 3 for a large range of sizes of tires in connection with which the present type of cover is to be employed.

The ends 4 and 6 of the corresponding segments may be adjustably connected in any suitable manner, though preferably in accordance with the present invention the end 6 is provided with a series of circumferentially spaced keyhole slots 7 to selectively receive the headed pin 8 secured to and extending inwardly from the end 4. The head 9 of the pin 8, it will be understood, is of a size which will not pass through the narrow portion 10, but will pass through the enlarged portion of the keyhole slot 7. It will thus be appreciated that tension exerted on the ends 4 and 6 tending to hold them apart will serve to maintain the headed pin 8 within a corresponding slot 7, and when it is desired to separate such ends, it is necessary merely to move them toward each other until the head 9 registers with the enlarged portion of the corresponding slot 7, whereupon such end 9 may be moved through and out of the slot 7 in a substantially radial direction.

As previously stated, the end 5 of the segment 3 overlaps the end 7 of the segment 2. These ends are provided with cooperating instrumentalities for tightening the parts 2 and 3 about the tire on which the cover is to be mounted, thereby securing the headed pin 8 in the reduced portion 10 of the keyhole slot 7 in connection with which it is to be used. These instrumentalities include preferably a bracket on each end 5 and 7, a threaded member for adjusting said ends relative to each other and a device for locking the threaded member in adjusted position. The bracket 11 is permanently secured by rivets or the like 12 passing through its flanges 13 to the end 7, said bracket being substantially U-shaped and being substantially centrally cut away as shown at 14 to provide a pair of spaced U-shaped portions 15. A preferably cylindrical pivot element 16 is slipped between the arms of the U-shaped member 11 into the position shown and is adapted for bearing engagement with the cylindrically curved bights of the portions 15. The pivot element 16 is substantially centrally tapped at 17 to receive the threads 18 of the bolt 19, the diameter of the threaded portion being somewhat less than the width of the space or cut 14 to permit movement of the bolt between the portions 15. The free extremity 20 of the bolt 19 is somewhat enlarged to prevent removal of the bolt from the cylindrical pivot element 16.

A bracket 21, permanently secured to the end 5 of the segment 3 by rivets 22, spot-welding or the like, is provided with an opening 23 adapted to be disposed in substantial register with the space 14 between the U-shaped portions 15 of the bracket 11. The bracket 21 is essentially U-shaped, the opening 23 serving to space the arms 24. The innermost portion 25 of the opening 23 is of substantially semi-cylindrical curvature to rotatably receive the cylindrical head 26 of the bolt 19. The bracket 21 is countersunk at 27 to receive the shoulder 28 on the head 26. It will be noted that the countersunk portion 27 is more than semi-circular, so that as long as the shoulder 28 is disposed in the countersunk portion 27, the head and shoulder 26 and 28 cannot pass laterally out of the opening 23 in the bracket 21. The head 26 of the bolt 19 is provided with suitable wings 29 to facilitate rotation of the bolt.

The arms 24 of the U-shaped bracket 21 are provided with at least one recess 30 communicating with the opening 23 although additional recesses may be provided in accordance with the degree of adjustment desired. The head 26 includes key operated tumbler instrumentalities, not shown, of conventional construction wherein a plunger 31 is preferably spring pressed, and when released occupies selectively one of the recesses 30, thereby preventing unauthorized rotation of the bolt 19. Upon insertion of the appropriate key 32 in the tumbler means aforesaid, the plunger 31 may be withdrawn into the head 26, whereupon the bolt 19 may be rotated.

In assembling the tire cover on the tire, it is advisable to place the tire on a horizontal support such as the ground, place the side plate 1 in position to substantially overlie the side wall of the tire, apply the segment 2 over the tread of the tire and in overlapping relation to the side plate 1, hook the headed pin 8 into interlocking engagement with one of the keyhole slots 7, and bring the end 5 of the segment 3 around into overlapping relation with the end 7 of the segment 2, with the segment 3 in overlapped relation to the side plate 1. It is to be understood that the bolt 19 is preferably a permanent part of the segment 2, since the head 20 of the bolt 19 prevents removal of the latter from the bracket 11, which is in turn fixed to the segment 2. With the brackets 11 and 21 juxtaposed, as seen in Figures 1, 2 and 3, and the bolt 19 adjusted relative to the pivot element 16 to such an extent that the face 33 of the shoulder 28 will clear the corners 34 of the arms 24 of the bracket 21, the bolt 19 is swung up from its dotted position, looking at Figure 2, together with the element 16 until the head 26 of the bolt is in substantial alinement with the wall of the opening 23, whereupon the wings 29 are grasped and the bolt 19 rotated and adjusted relative to the pivot element 16 until the face 33 of the shoulder 28 is in tight engagement with the corresponding face 35 of the countersunk portion 27. During this time, it will be understood that the plunger 31 is in retracted position. When the bolt 19 has been tightened sufficiently with respect to the bracket 21, the tumbler means of the lock is operated by the appropriate key 32, to release the plunger 31, whereupon the bolt 19 is given a slight turn, if necessary, sufficient to bring the plunger 31 in register with one of the openings 30, whereupon the plunger will snap into such recess. In the case of a plunger which is not spring pressed, it will be appreciated that the task of positioning the same in a corresponding recess is very simple and requires no elaboration. The cover is thus securely locked in adjusted position on the tire in connection with which it is to be used.

In removing the tire cover, it is necessary merely to apply a key to the tumbler instrumentalities on the head of the bolt 19 to withdraw the plunger 31 from its corresponding recess 30, and grasp the wings 29 to withdraw the shoulder 28 sufficiently to permit the face 33 thereof to pass beyond the corners 34 of the arms 24 of the bracket 21, whereupon, by reason of the pivotal mounting of the element 16 in the portions 15 of the bracket 11, the bolt 19 will swing sufficiently to bring the head 26 downward beyond the bracket 21, as shown in dotted lines in Figure 2. The end 5 of the segment 3 now being free, said segment may be shifted circumferentially to dispose the head 9 of the pin 8 in register with the enlarged portion of the slot with which it has been associated, whereupon the resilience of the metal of the segment 3 and the rubber of the tire will permit a radial outward movement of the end 4, to draw the head 9 out of the slot 7. The segments 2 and 3 are now free of each other and may be separated from the tire, whereupon the side plate 1 is also free and may be removed from the tire. This may be done regardless whether the tire is horizontal or upright or in any other position.

The extremity 36 of the end 4 may extend beyond the headed pin 8 a sufficient distance to overlap all of the key-hole slots 7, even when the outermost slot 7a is interlocked with the pin 8.

The segments 2 and 3 are preferably resilient in order that they may properly conform to the curvature of various tires and various sizes of tires. Moreover, while the rubber of the tire, by reason of its tight engagement with the side plate 1 and segments 2 and 3, will serve to a large extent to prevent rattling, it is considered well within the province of the invention to employ suitable anti-rattling means between the overlapped ends of the respective segments, and also between the segments themselves and the outer periphery of the side plate 1. The latter may take the form of a rubber or like resilient strip which may be secured at 37 to the outer periphery of the side plate 1.

It will be appreciated from the foregoing, that the tire cover may consist entirely of the segments 2 and 3 suitably locked together, or it may consist of these segments used in connection with the side plate 1. In either event, it will be noted that a tire cover of unusually pleasing appearance is presented wherein the parts are not complicated, but are on the contrary very simple, are easily assembled and disassembled from a spare tire and serve to adequately protect the tire, and which are capable of secureMent to any size tire within a large range.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A divided cover for an automobile spare tire, said cover comprising a pair of substantially semicircular segments, one end of one of said segments being provided with a longitudinal series of slots and the adjacent end of the other segment being provided with a projection for selective engagement in any of said slots whereby the cover may be adjusted for tires of various sizes, and means for securing the other ends of said segments against unauthorized separation.

2. A divided cover for an automobile spare tire, said cover comprising a pair of substantially semicircular segments, one end of one of said segments being provided with a longitudinal series of slots and the adjacent end of the other segment being provided with a projection for selective engagement in any of said slots whereby the cover may be adjusted for tires of various sizes, and means for securing the other ends of said segments against unauthorized separation, said segments being so arranged when in proper tire protecting position that at least one of said slots is concealed.

3. In a spare tire cover construction having overlapped ends, means for maintaining the ends in overlapped relation, said means including a bracket mounted on each of said ends, a bolt threadedly and pivotally connected to one of said brackets, means preventing removal of said bolt from said one bracket, said bolt having a head and said other bracket having an opening to accommodate said head, said head being rotatable in said opening, said head having a shoulder engageable with said bracket adjacent said opening upon tightening up of said bolt with respect to the first mentioned bracket, and means for locking said bolt in said second bracket.

4. In a divided tire cover construction, means for adjusting the cover ends relative to each other to secure the cover to tires of various sizes, said means including a bolt pivotally and threadedly secured to one of the ends, a bracket provided on the other end and having a pair of spaced arms, said bolt having a head arranged for accommodation in the space between said arms, whereby said head may be swung about its pivotal connection relative to the first mentioned end into and out of said space, said head having a shoulder and said arms providing seats upon which said shoulder is adapted to rest to prevent movement of the head of the bolt out of said space, whereby said bolt may be tightened up to draw the cover tightly about the tire, and means for locking the bolt against removal from said bracket.

5. In a divided tire cover construction, means for drawing the cover tightly about the tire, said means comprising a bracket for one cover end and providing a pair of spaced bearing surfaces, a pivot element disposed in said bracket in rotatable engagement with said surfaces, a bolt having a threaded portion passing through and in threaded engagement with said element between said surfaces and movable in the space between said surfaces, whereby said bolt is pivotally and threadedly connected to said bracket and serves to prevent separation of said element and bracket, means on said bolt to prevent separation of the bolt from said element, a projection for the other cover end, said bolt having a head engageable with said projection, whereby upon rotation of the bolt in one direction, said projection and said bracket will be drawn toward each other to thereby tighten the cover about the tire, said projection including spaced arms between which said head of the bolt is disposed, the pivotal connection between the bolt and the bracket providing for movement of said head in and out of said space.

6. In a divided tire cover construction, means for drawing the cover tightly about the tire, said means comprising a bracket for one cover end and providing a pair of spaced bearing surfaces, a pivot element disposed in said bracket in rotatable engagement with said surfaces, a bolt having a threaded portion passing through and in threaded engagement with said element between said surfaces and movable in the space between said surfaces, whereby said bolt is pivotally and threadedly connected to said bracket and serves to prevent separation of said element and bracket, means on said bolt to prevent separation of the bolt from said element, a projection for the other cover end, said bolt having a head engageable with said projection, whereby upon rotation of the bolt in one direction, said projection and said bracket will be drawn toward each other to thereby tighten the cover about the tire, said projection including spaced arms between which said head of the bolt is disposed, the pivotal connection between the bolt and the bracket providing for movement of said head in and out of said space, said projection having a recess, and a key-actuated plunger in the head for engaging in said recess.

HERBERT S. JANDUS.